United States Patent [19]

Soldat

[11] Patent Number: 5,042,641

[45] Date of Patent: Aug. 27, 1991

[54] APPARATUS FOR CLEANING THE STEPS OF AN ESCALATOR

[75] Inventor: Adalbert Soldat, Vienna, Austria

[73] Assignee: Inventio AG, Switzerland

[21] Appl. No.: 546,108

[22] Filed: Jun. 29, 1990

[30] Foreign Application Priority Data

Jun. 30, 1989 [CH] Switzerland ........................ 449/89

[51] Int. Cl.$^5$ ........................................ B65G 45/18

[52] U.S. Cl. ........................................ 198/496; 198/333

[58] Field of Search ........................ 198/333, 494, 496

[56] References Cited

U.S. PATENT DOCUMENTS

| | | | |
|---|---|---|---|
| 1,857,808 | 5/1932 | Diederichs | 198/496 X |
| 3,151,726 | 10/1964 | Nelson | 198/496 X |
| 3,678,533 | 7/1972 | Cravits | 15/302 |
| 4,514,872 | 5/1985 | Hopkins | 15/256.5 |

FOREIGN PATENT DOCUMENTS

| | | |
|---|---|---|
| 3016597 | 11/1981 | Fed. Rep. of Germany . |
| 3704388 | 8/1988 | Fed. Rep. of Germany . |
| 462102 | 3/1937 | United Kingdom . |
| 2132965 | 7/1984 | United Kingdom . |

*Primary Examiner*—Joseph E. Valenza
*Assistant Examiner*—James R. Bidwell
*Attorney, Agent, or Firm*—Marshall & Melhorn

[57] ABSTRACT

An apparatus for cleaning escalator steps having grooved front surfaces cleans during the operation of the escalator. A brush extending across the entire width of each step is positioned under the rear edge of the tread. The bristles of the brush press against the front surface of the adjacent step when the steps are in predetermined regions of the escalator. The relative motion of the steps as they move from the horizontal to the inclined and back to the horizontal regions creates a relative vertical motion between the brush and the front surface for the cleaning of the front surface. The front surface thus is cleaned twice per revolution of the step conveyor by being moved against the brush bristles, once from top to bottom and once from bottom to top, practically across the entire height of the step.

15 Claims, 2 Drawing Sheets

APPARATUS FOR CLEANING THE STEPS OF AN ESCALATOR

BACKGROUND OF THE INVENTION

The present invention relates generally to escalators and, in particular, to an apparatus for cleaning the steps of an escalator as the escalator is operating.

If relatively long intervals are scheduled for the periodic cleaning of escalators. the treads and front surfaces of the steps, both of which have ribs and grooves formed thereon, tend to collect dirt sediment which requires additional or more frequent cleaning operations. A portion of the dirt which is deposited on the steps is dumped automatically into dirt hoppers at the upper or lower return regions, especially in dry weather and depending on the direction of travel of the escalator Another portion of the dirt, however, can be deposited in the grooves and can only be removed with difficulty For this reason, various devices for the cleaning of escalators in particular for the steps of escalators, have been constructed and utilized with some degree of success.

German Patent Application No. 37 04 388 shows cleaning equipment for the steps of escalators which is provided as an independent, portable unit The cleaning equipment consists of a supporting bracket with a rocker bar carrying an electric motor and a rotatably supported brush roller driven by a V-belt. Additionally, in the immediate vicinity of the brush roller, a suction device can be provided for removing the brushed-off dirt. The cleaning equipment with its supporting bracket is placed, for example on the lowest step of a stopped escalator. The rocker bar with the brush roller is directed against the higher adjacent step The motor is turned on and the rotating brush roller is pressed manually onto the front surface of the adjacent step with the aid of the rocker bar The brush roller is moved upward on the step and guided over the horizontal tread. In this way. the grooved front surface and the grooved tread of the step are cleaned by the brush roller which extends to the bottom of the grooves and the brushed-off dust is removed by suction. For the cleaning of the next step, the cleaning device is placed on the cleaned tread and again the next higher adjacent step is cleaned. The process is repeated until all visible steps of the escalator are cleaned. In order to clean all steps of the escalator, the step belt is moved forward by stages through temporary switching-on of the escalator and cleaned as described earlier until all steps of the escalator have been cleaned. A drawback of this device is that the relatively unwieldy cleaning equipment is required, which device must be dragged or pulled around on the escalator, that the cleaning can only take place when the escalator is not operating and that there exists a certain danger of accidents if during the moving forward by stages of the step conveyor, the cleaning equipment remains placed on a step and is not removed from the escalator A further drawback is the fact that a certain region on the inner edge between the tread and the front surface of an adjacent step cannot be reached by the round brush roller and, therefore, cannot be cleaned adequately.

German Patent No. 30 16 597 shows another device for cleaning the steps of an escalator which device is permanently built into a return point of the escalator. The cleaning device consists of an adjustable base frame with a carrying device supported on rails and a fixed cleaning brush. By force of springs, the cleaning brush is pressed against the passing steps at the return point and the tread of each step is continuously brushed and cleaned while the escalator is operating. A disadvantage of this cleaning device is that the front surfaces of the steps cannot be cleaned because the front surfaces are not easily accessible in the region of the return points.

It is an object of the present invention to provide an escalator cleaning device which continuously cleans every front surface of the steps as the escalator continues to operate.

SUMMARY OF THE INVENTION

The present invention concerns an apparatus for cleaning the steps of an escalator including a brush adapted to be attached to an escalator step below a rear edge of the step. The brush has bristles adapted to extend across the width of and into contact with a front surface of an adjacent escalator step. The bristles can be shaped to match the shape of the ribs and the grooves formed on the front surface of the adjacent step. The brush can be slidably mounted in a holder for adjustment with respect to the front surface of the adjacent step to be cleaned.

An advantages of the present invention is that every grooved front surface of the steps in an escalator is cleaned while the escalator is operating. It is, therefore, not necessary to stop the escalator and to clean during the off or non-operating time with the aid of portable cleaning devices. A further advantage the present invention is that no additional personnel are required since the cleaning of the front surfaces of the steps is automatic. Another advantage is that since the cleaning is performed continuously, immediately after soiling the steps are cleaned thereby preventing sticking of dirt on the front surfaces.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1:
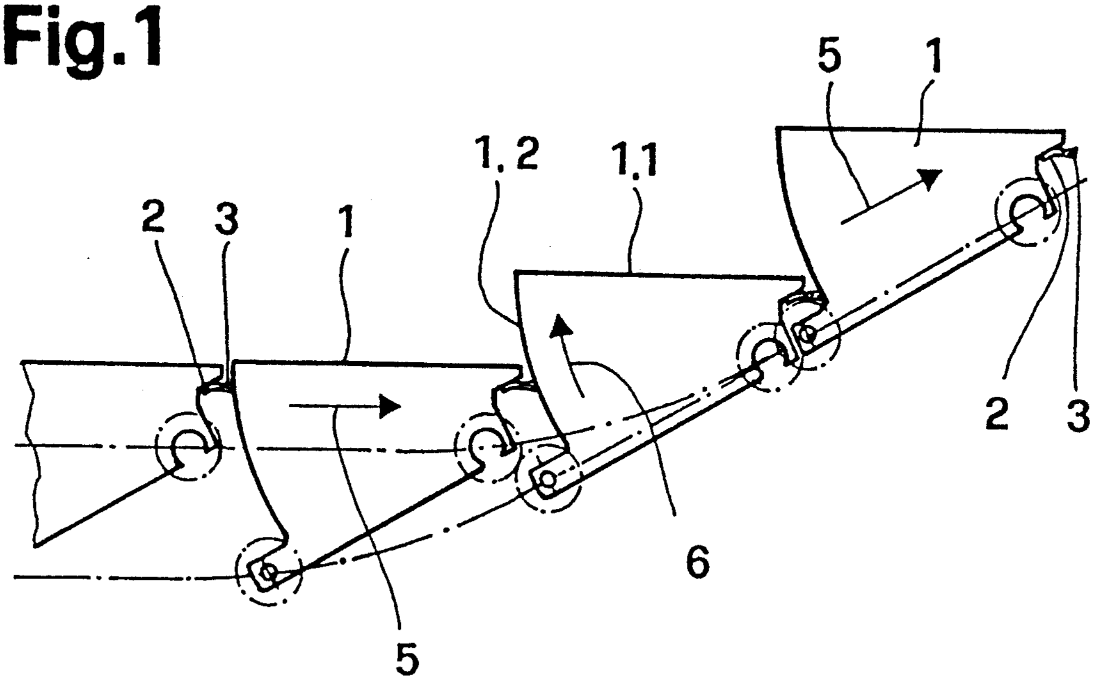
FIG. 1 is a side elevational view of a portion of a step conveyor in accordance with the present invention shown during a transition from a lower horizontal movement region to an inclined movement region.
Figure 2:
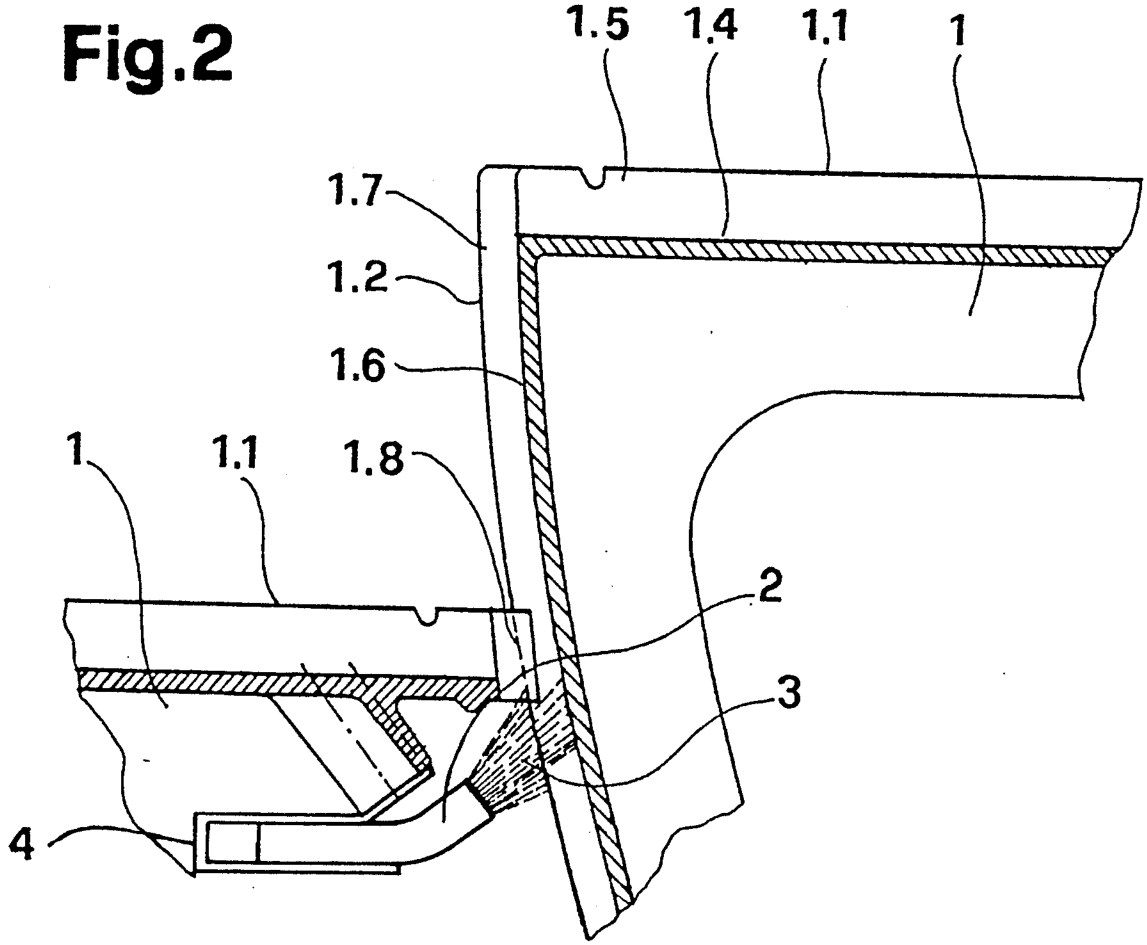
FIG. 2 is an enlarged cross sectional view of two adjacent steps in the transition region of the conveyor according to the FIG. 1.

In the FIGS. 1 and 2, a step is designated with 1. Each step 1 includes a tread 1.1 and a front surface 1.2. The tread 1.1 and the front surface 1.2 have a plurality of grooves such as grooves 1.4 and 1.6 respectively formed between spaced apart, generally parallel ribs 1.5 and 1.7 respectively as shown in FIG. 2. Meshing into the grooves 1.6 of the front surface 1.2 of each of the steps 1 is a toothed edge 1.8 formed at the rear of the tread 1.1 of the adjacent step 1. Positioned under the rear edge of the tread 1.1 is a brush 2 which has bristles 3 extending across the width of and toward the adjacent front surface 1.2. The bristles 3 can be the same length or can be shaped to match the shape of the front surface 1.2 for sweeping the grooves 1.6 and the ribs 1.7 of the front surface of the adjacent step 1. The brush 2 can be solidly clamped in a holder 4 fastened on the step body, or alternatively be slidably supported, as shown in FIG. 2, for adjustment with respect to the front surface 1.2. The arrows 5 in FIG. 1 indicate the direction of movement of the step conveyor, while the arrow 6 indicates the relative motion of the steps 1 which assure the horizontal position of the tread 1.1 in the inclined region of the escalator.

Figure 3:
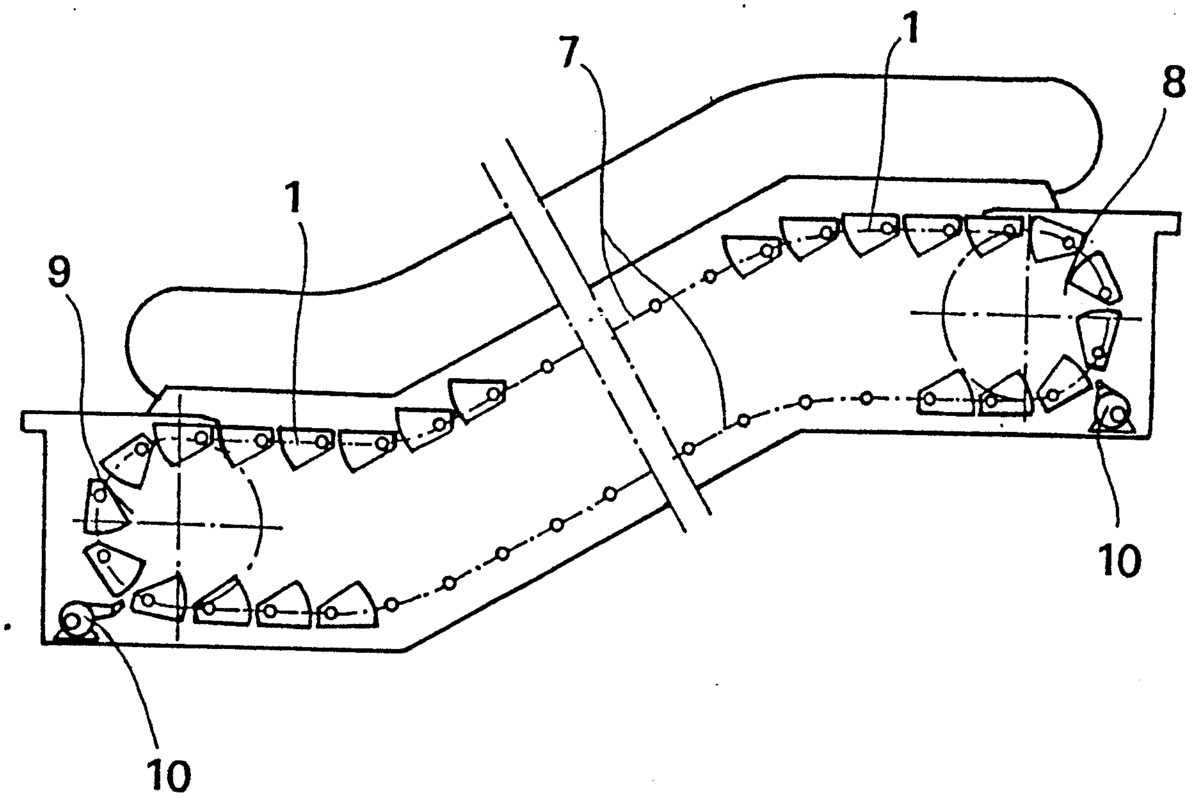
FIG. 3 is a schematic cross sectional view through an escalator utilizing the step conveyor shown in FIGS. 1 and 2.

In the FIG. 3, the step conveyor is designated with 7 and is formed of a plurality of the individual steps 1. The step conveyor 7 has an upper reversal region 8 and a lower reversal region 9 at opposite ends connected to horizontal return regions connected at opposite ends of inclined regions. At the upper reversal region 8 and/or at the lower reversal region 9. blower devices 10 can be positioned to remove dirt loosened by the brushes 4.

The cleaning equipment described above operates in the following manner: The brush 2 attached below the rear of the tread 1.1 of each step 1 is directed. during the assembly of the step 1 into a step conveyor, against the front surface 1.2 of an adjacent step 1 with an initial stressing force. If the step is assembled in the inclined region of the step conveyor which is visible during operation. the brush 2 is already lying against the front surface of the adjacent step. If the step is assembled in the region of the upper or lower reversal regions, there is no contact between the brush and the front surface of the adjacent step. In the return regions between the upper and lower reversal regions, the brush and the front surface again press against each other, but no relative vertical movement combined with a cleaning action takes place. During the downward travel in the inclined region, the same relative movements and cleanings of the front surfaces result as during the upward travel, but in reverse sequence and direction. The front surface of each individual step is thus brushed and cleaned during operation twice in each escalator cycle.

As stated above, a blower device 10 directing air on the front surfaces 1.2 of the steps 1 and/or on the brushes 2 can be provided at the upper and/or the lower reversal regions of the step conveyor. The blower device 10 blows away any released dirt and dirt which has not dropped off during the return motion of the step conveyor before the step returns to the visible regions of the escalator.

Thus, the cleaning equipment according to the present invention is useful as a supplement to a cleaning device which serves only for the cleaning of the treads of the steps.

In accordance with the provisions of the patent statutes, the present invention has been described in what is considered to represent its preferred embodiment. However. it should be noted that the invention can be practiced otherwise than as specifically illustrated and described without departing from its spirit or scope.

What is claimed is:

1. An apparatus for cleaning the steps of an escalator with a brush extending across the entire width of an escalator step comprising: a brush adapted to be attached to an escalator step below a rear edge of the step and having bristles adapted to extend into contact with a front surface of an adjacent escalator step of an escalator.

2. The apparatus according to claim 1 wherein said brush bristles are shaped to match the shape of the front surface of the adjacent step.

3. The apparatus according to claim 2 wherein said brush is adjustable with respect to the front surface of the adjacent step to be cleaned.

4. The apparatus according to claim 3 wherein said brush is pressed against the front surface of the adjacent step by an initial stressing force.

5. The apparatus according to claim 1 wherein said brush is adjustable with respect to the front surface of the adjacent step to be cleaned.

6. The apparatus according to claim 5 including a holder for slidably supporting said brush for adjustment with respect to the front surface of the adjacent step to be cleaned.

7. In an escalator having a plurality of steps, an apparatus for cleaning the steps comprising: a plurality of brushes each attached to an associated one of a plurality of escalator steps of an escalator below a rear edge of the associated step, each said brush having bristles adapted to extend into contact with a front surface of an adjacent one of the escalator steps.

8. The apparatus according to claim 7 including a blower device positioned adjacent the escalator for directing a stream of air at least one of the front surfaces of the steps and said brushes.

9. The apparatus according to claim 8 wherein said blower device is positioned adjacent a lower reversal section of the escalator for directing a stream of air at least one of the front surfaces of the steps and said brushes.

10. The apparatus according to claim 8 wherein said blower device is positioned adjacent an upper reversal section of the escalator for directing a stream of air at least one of the front surfaces of the steps and said brushes.

11. The apparatus according to claim 8 including a pair of said blower devices each positioned adjacent one of a lower reversal section and an upper reversal section of the escalator for directing a stream of air at least one of the front surfaces of the steps and said brushes.

12. The apparatus according to claim 7 wherein said brush bristles are shaped to match the shape of the front surface of the adjacent step.

13. The apparatus according to claim 7 wherein said brush is adjustable with respect to the front surface of the adjacent step to be cleaned.

14. The apparatus according to claim 13 wherein said brush is pressed against the front surface of the adjacent step by an initial stressing force.

15. An apparatus for cleaning the steps of an escalator comprising: a brush adapted to be attached to an escalator step below a rear edge of the step said brush having bristles adapted to extend across the width of and into contact with a front surface of an adjacent escalator step of an escalator, said bristles shaped to match the shape of the front surface of the adjacent step said brush being adjustable with respect to the front surface of the adjacent step to be cleaned.

* * * * *